Figure 1:
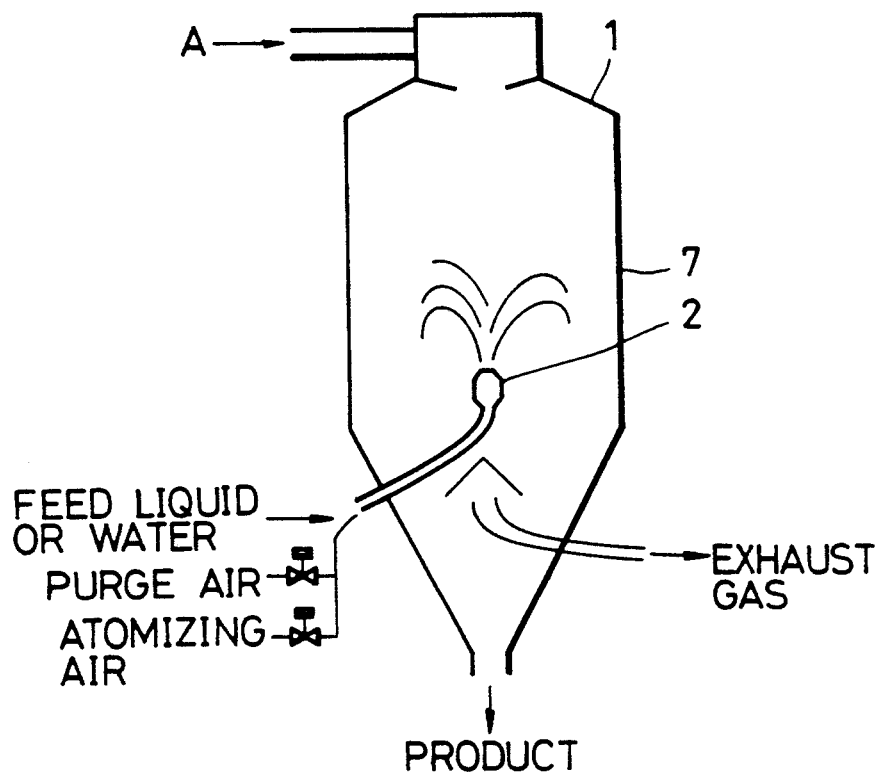

United States Patent [19]

Ito et al.

[11] Patent Number: 5,272,820
[45] Date of Patent: Dec. 28, 1993

[54] TWO-FLUID PRESSURE NOZZLE OF UPWARD INJECTION TYPE, SPRAY DRYER USING THE NOZZLE, AND METHOD FOR CONTROL OF DROPLET DIAMETER IN THE NOZZLE

[75] Inventors: Takashi Ito, Fujieda; Shizuo Aishima; Masaaki Ohkawara, both of Yokohama, all of Japan

[73] Assignee: Ohkawara Kakohki, Co., Ltd., Kanagawa, Japan

[21] Appl. No.: 725,104

[22] Filed: Jul. 3, 1991

[30] Foreign Application Priority Data

Mar. 12, 1991 [JP] Japan .................................. 3-72353
Mar. 12, 1991 [JP] Japan .................................. 3-72354

[51] Int. Cl.$^5$ .............................................. F26B 17/00
[52] U.S. Cl. .................................. 34/57 A; 159/4.06; 110/244; 239/406
[58] Field of Search ............. 34/10, 57 A; 159/3, 159/4.06, DIG. 3, 4.01; 110/245, 243, 244; 239/398, 406

[56] References Cited

U.S. PATENT DOCUMENTS

| | | |
|---|---|---|
| 3,082,098 | 3/1963 | Bergquist . |
| 3,231,413 | 1/1966 | Berquin ........................ 159/4.06 |
| 4,422,900 | 12/1983 | Bordelon et al. ............... 159/4.01 |
| 4,619,843 | 10/1986 | Mutsers et al. ................ 159/4.06 |
| 4,701,353 | 10/1987 | Mutsers et al. ................ 159/4.06 |
| 4,809,442 | 3/1989 | Iwaya et al. .................... 34/10 |

FOREIGN PATENT DOCUMENTS 869143  5/1961 United Kingdom .
1371153 10/1974 United Kingdom .

OTHER PUBLICATIONS

Abstract of Russian Patent SU-614-821, English translation.
Abstract of German Patent DT 197805, English translation.

*Primary Examiner*—Henry A. Bennett
*Assistant Examiner*—Denise L. Gromada
*Attorney, Agent, or Firm*—Armstrong, Westerman, Hattori, McLeland & Naughton

[57] ABSTRACT

The injection type nozzle of the present injection is a two-fluid pressure nozzle comprising a centrifugal pressure nozzle for spraying a feed liquid and a cylindrical pipe for blowing out a high-speed gas, provided around the centrifugal pressure nozzle, said two-fluid pressure nozzle having a tapered structure at the front end portion and said cylindrical pipe for blowing out a high-speed gas, having air-purging through-holes at the front end portion. The spray dryer of the present invention comprises a drying chamber, the above two-fluid pressure nozzle provided at the bottom of the drying chamber with the nozzle tip directed upward, an inlet for feeding a hot gas into the drying chamber, and an outlet for driving an exhaust gas out of the drying chamber. The spray dryer employing a closed system according to the present invention comprises a drying chamber, the above two-fluid pressure nozzle provided at the bottom or top of the drying chamber with the nozzle tip directed upward or downward, an inlet for feeding a hot gas into the drying chamber, and an outlet for driving an exhaust gas out of the drying chamber, in which spray dryer the hot gas for drying fed into the drying chamber and/or the high-speed gas for atomization is fed by circulating the whole or part of the exhaust gas after spray drying. In the two-fluid pressure nozzle of the present invention, diameters of droplets formed can be controlled by controlling the flow speed of the high-speed gas for atomization.

15 Claims, 4 Drawing Sheets

TWO-FLUID PRESSURE NOZZLE OF UPWARD INJECTION TYPE, SPRAY DRYER USING THE NOZZLE, AND METHOD FOR CONTROL OF DROPLET DIAMETER IN THE NOZZLE

BACKGROUND OF THE INVENTION AND DESCRIPTION OF THE RELATED ART

The present invention relates to a two-fluid pressure nozzle of upward injection type, a spray dryer using the nozzle, a spray dryer employing a closed system wherein the waste gas after spray drying is used as a hot gas for drying and/or a high-speed gas for atomization, and a method for control of droplet diameter in the nozzle.

Generally in spray dryers, a nozzle is provided at the top of a drying chamber with the nozzle tip directed downward; a feed liquid is blown downward from the nozzle to spray the liquid; the spray is contacted with a hot gas fed from the top of the drying chamber to effect drying and solidification. The downward blowoff of feed liquid is based on a conventional thinking that the downward blowoff utilizing gravity gives spraying of lesser turbulence and is more effective.

Further in spray dryers, there is generally employed an open system wherein the hot gas for drying and the high-speed gas for atomization are always fed as a fresh gas.

Spray dryers have conventionally used a rotary disc, a two-fluid nozzle or a centrifugal pressure nozzle.

The rotary disc makes easy change of particle diameter, switch between water and feed liquid, and change of liquid flow rate, but requires a high-speed rotating machinery and makes the maintenance complex. The two-fluid nozzle sprays a feed liquid by means of a high-speed air stream, but requires a large amount of high pressure air and incurs a high operating cost. Hence, the centrifugal pressure nozzle is preferentially used generally.

With the centrifugal pressure nozzle, a pressurized liquid receives a centrifugal force and thereby is sprayed from the orifice in a thin film of hollow cone shape; the hollow cone-shaped film is broken at the front periphery by the interaction with air; thereby, fine droplets are formed. In the centrifugal pressure nozzle, the diameters of droplets formed by spraying are controlled by the pressure applied to the feed liquid; however, change in pressure invites change in liquid flow rate. Therefore, control of droplet diameter is effected while the liquid flow rate is kept constant by using nozzle parts of appropriate combination and adjusting the spraying pressure.

In obtaining a powder product having a large average particle diameter or a dried product of a substance having a large specific gravity, for example, in obtaining large ceramic particles having an average particle diameter of 150 mm or granulating a PZT ceramic containing a lead compound having a large specific gravity, a long drying time is required for thorough drying. This long drying time, however, cannot be secured with a nozzle directed downward.

When the feed liquid contains an inflammable solvent, there is a danger of fire or explosion. When drying is effected in air, substance(s) which is (are) easily oxidized must be prevented from being oxidized. When the waste gas contains an offensive odor, the spreading of the odor must be prevented from the standpoint of environmental pollution control. When an expensive and/or toxic solvent is used, it must be recovered.

Meanwhile, in the conventional method for control of droplet diameter, a large number of nozzle parts were needed; however, it was impossible to always have these parts in stock and selection of the parts of appropriate combination needed skill and know-how. In some cases, the viscosity, concentration, surface tension, etc. of feed liquid change during operation, which necessitated temporary suspension of operation for replacement of nozzle parts.

The present invention has been made in view of the above-mentioned problems of the prior art. An object of the present invention is to provide a nozzle of upward injection type which can atomize even a feed liquid difficult to dry by ordinary methods, a feed liquid of large density or a large droplets into fine droplets and dry them completely by employing a longer residence time in a drying chamber and which can prevent clogging of a spraying nozzle by cooling the spraying nozzle with an atomization gas blown from around the spraying nozzle, as well as a spray dryer using said nozzle of upward injection type.

A further object of the present invention is to provide a spray dryer wherein a high-speed gas for atomization and/or a hot gas for drying are circulated by a closed system for the prevention of fire and explosion, the prevention of solute in feed liquid from being oxidized, the prevention of environmental pollution and the recovery of resource.

A still further object of the present invention is to provide a method for continuously controlling droplet diameters with the feed liquid flow rate and feed liquid pressure being kept constant, without replacing nozzle parts.

SUMMARY OF THE INVENTION

In order to achieve the above objects, the present invention provides a two-fluid pressure nozzle of upward injection type comprising a centrifugal pressure nozzle for spraying a feed liquid and a cylindrical pipe for blowing out a high-speed gas, provided around the centrifugal pressure nozzle, which two-fluid pressure nozzle has a tapered structure at the front end portion and which cylindrical pipe for blowing out a high-speed gas has air-purging through-holes at the front end portion.

The present invention also provides a spray dryer comprising a drying chamber, a two-fluid pressure nozzle provided at the bottom of the drying chamber with the nozzle tip directed upward, an inlet for feeding a hot gas into the drying chamber, and an outlet for driving an exhaust gas out of the drying chamber, said two-fluid pressure nozzle comprising a centrifugal pressure nozzle for spraying a feed liquid and a cylindrical pipe for blowing out a high-speed gas, provided around the centrifugal pressure nozzle and said two-fluid pressure nozzle having a tapered structure at the front end portion.

The present invention further provides a spray dryer comprising a drying chamber, a two-fluid pressure nozzle provided at the bottom of the drying chamber with the nozzle tip directed upward, an inlet for feeding a hot gas into the drying chamber, and an outlet for driving an exhaust gas out of the drying chamber, said two-fluid pressure nozzle comprising a centrifugal pressure nozzle for spraying a feed liquid and a cylindrical pipe for blowing out a high-speed gas, provided around the centrifugal pressure nozzle and said two-fluid pressure nozzle having a tapered structure at the front end portion, in which spray dryer a hot gas for drying to be fed into the drying chamber and/or a high-speed gas for atomization are fed by a closed system wherein the whole or part of the exhaust gas after spray drying is circulated.

The present invention furthermore provides a method for control of droplet diameter in a two-fluid pressure nozzle, said two-fluid pressure nozzle comprising a centrifugal pressure nozzle for spraying a feed liquid and a cylindrical pipe for blowing out a high-speed gas, provided around the centrifugal pressure nozzle and said two-fluid pressure nozzle having a tapered structure at the front end portion, which method comprises spraying a feed liquid from the two-fluid pressure nozzle while controlling the flow rate of the high-speed gas blown off from the two-fluid pressure nozzle, thereby to form droplets of controlled diameters.

The feed liquid sprayed upward from the two-fluid pressure nozzle ascends and descends in a parabolic orbit. Therefore, the space residence time of droplets becomes about two times as compared with the case of mere vertical falling; consequently, the drying time of droplets becomes about two times.

Figure 2:
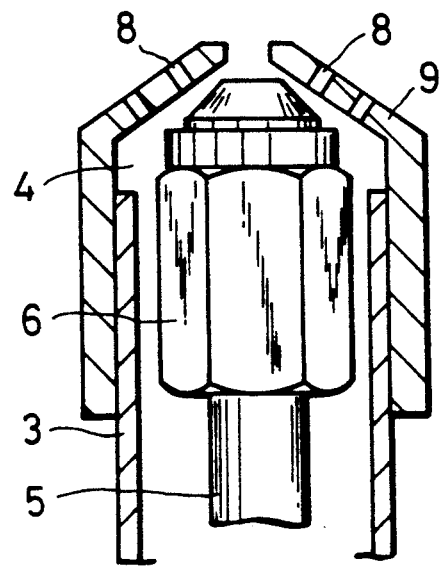

Arranging the two-fluid pressure nozzle with the nozzle tip directed upward, at the bottom of the drying chamber may cause a blooming phenomenon in which the falling dried particles deposit on the two-fluid pressure nozzle or the droplets are dried and solidified at the front end portion of the two-fluid pressure nozzle. The phenomenon can be prevented by forming air-purging through-holes preferably at the front end portion of the cylindrical pipe for blowing out a high-speed gas, constituting the two-fluid pressure nozzle and by effecting air-purging.

When the feed liquid contains an inflammable solvent, the exhaust gas from the drying chamber is reused as the hot gas for drying and/or the high-speed gas for atomization, by employing a closed system.

The two-fluid pressure nozzle is a modification of a centrifugal pressure nozzle, and accordingly it has the properties of the centrifugal pressure nozzle basically.

The following empirical equations hold regarding the spraying properties of the centrifugal pressure nozzle.

$$D_d = c_1 \cdot P^{-0.2 \sim -0.3} \cdot D^{0.5 \sim 0.65} \mu^{0.15 \sim 0.22} \cdot \sigma^{0.6 \sim 0.7} \quad (1)$$

($D_d$ is a droplet diameter, P is a spraying pressure, D is a nozzle orifice diameter, $\mu$ is a liquid viscosity, $\sigma$ is a liquid surface tension, and $c_1$ is a constant.)

$$W = c_2 \cdot P^{0.5} \cdot D^2 \quad (2)$$

(W is a liquid flow rate, P is a spraying pressure, D is a nozzle orifice diameter, and $c_2$ is a constant.)

As is clear from the equations (1) and (2), the droplet diameter $D_d$ and the liquid flow rate W are automatically determined when the spraying pressure P is determined. In this case, decrease in spraying pressure P reduces liquid flow rate W in proportion to the decrease and increase droplet diameter $D_d$ in reverse proportion to the decrease. In the two-fluid pressure nozzle of the present invention, the droplet diameter is made smaller by the high-speed gas stream.

That is, the two-fluid pressure nozzle gives rise to atomization in two stages. First, primary atomization is caused by the pressure possessed by the liquid per se sprayed from the centrifugal pressure nozzle, whereby initial conditions are established. In this case, the above equations (1) and (2) are applied. In the primary atomization, the liquid is injected from the orifice of the two-fluid pressure nozzle in a hollow cone shape, as shown in FIG. 7.

Next, in the present invention, a high-speed gas is blown off from the front end of the cylindrical pipe and collided concentratedly with the droplets formed in the primary atomization, to give rise to secondary atomization.

Therefore, even when the liquid pressure P is decreased and the droplet diameter $D_d$ is increased, satisfactory atomization can be effected by the secondary atomization.

BRIEF DESCRIPTION OF THE DRAWINGS

FIG. 1 is a cross-sectional view showing an example of the spray dryer provided with the two-fluid pressure nozzle of the present invention.

FIG. 2 is a fragmentary cross-sectional view showing the front end portion of the two-fluid pressure nozzle of FIG. 1.

FIG. 3 is a schematic view showing an example of the spray dryer employing a closed system, of the present invention.

FIG. 4 is a schematic view showing an example of the spray dryer employing a semiclosed system, of the present invention.

FIG. 5 is a cross-sectional view showing an example of the two-fluid pressure nozzle of the present invention.

FIG. 6 is a fragmentary cross-sectional view showing the front end portion of the two-fluid pressure nozzle of FIG. 5.

FIG. 7 is a drawing showing primary atomization, i.e. a state in which a feed liquid is injected from a centrifugal pressure nozzle in a hollow cone shape.

DETAILED DESCRIPTION OF PREFERRED EMBODIMENTS

The present invention is hereinafter described in more detail with reference to Examples shown in the accompanying drawings. However, the present invention is not restricted to these Examples.

FIG. 1 is a cross-sectional view showing an example of the spray dryer provided with the two-fluid pressure nozzle of the present invention; FIG. 2 is a fragmentary cross-sectional view showing the front end portion of the two-fluid pressure nozzle of FIG. 1; FIG. 3 is a schematic view showing an example of the spray dryer employing a closed system, of the present invention; and FIG. 4 is a schematic view showing an example of the spray dryer employing a semiclosed system, of the present invention.

In FIG. 1 and FIG. 2, the numeral 1 indicates a spray dryer; the numeral 2 indicates a two-fluid pressure nozzle; the numeral 3 indicates a jacket pipe; the numeral 4 indicates an air nozzle; the numeral 5 indicates a feed liquid (or water) pipe; the numeral 6 indicates a centrifugal pressure nozzle for spraying a feed liquid (or water); the numeral 7 indicates a drying chamber; the numeral 8 indicates air-purging through-holes. That is, the two-fluid pressure nozzle 2 of the present invention comprises a feed liquid pipe 5 for spraying a feed liquid or water, a jacket pipe 3 provided around the feed liquid pipe, a centrifugal pressure nozzle 6 provided at the front end portion of the feed liquid pipe and an air nozzle 4 formed around the centrifugal pressure nozzle, the centrifugal pressure nozzle 6 and the air nozzle 4 each having a smaller diameter at a point closer to the front end, i.e. a tapered structure as shown in FIG. 2, and the jacket pipe 3 having air-purging through-holes 8 at the front end portion 9.

The two-fluid pressure nozzle 2 is provided at the bottom of a drying chamber 7 of a spray dryer 1 with the nozzle tip directed upward. Therefore, a feed liquid is sprayed upward and then falls drawing a parabola. Consequently, a drying time about two times that of downward falling can be obtained.

The pressure for spraying the feed liquid or water from the centrifugal pressure nozzle 6 can be appropriately determined in accordance with the above-shown equations (1) and (2) regarding the spraying characteristics of the centrifugal pressure nozzle.

In the air nozzle 4 formed around the centrifugal pressure nozzle 6, the air-blowing speed is 80 m/sec or more, preferably 100 m/sec or more and the air pressure is generally 0.1 kg/cm$^2$ or more, preferably 0.2 kg/cm$^2$ or more, when water is sprayed from the centrifugal pressure nozzle. When a feed liquid is sprayed from the centrifugal pressure nozzle, the air-blowing speed is reduced to one half to one over several tens. Of course, the air nozzle 4 can be operated under conditions other than mentioned above, depending upon the nozzle structure.

Figure 3:
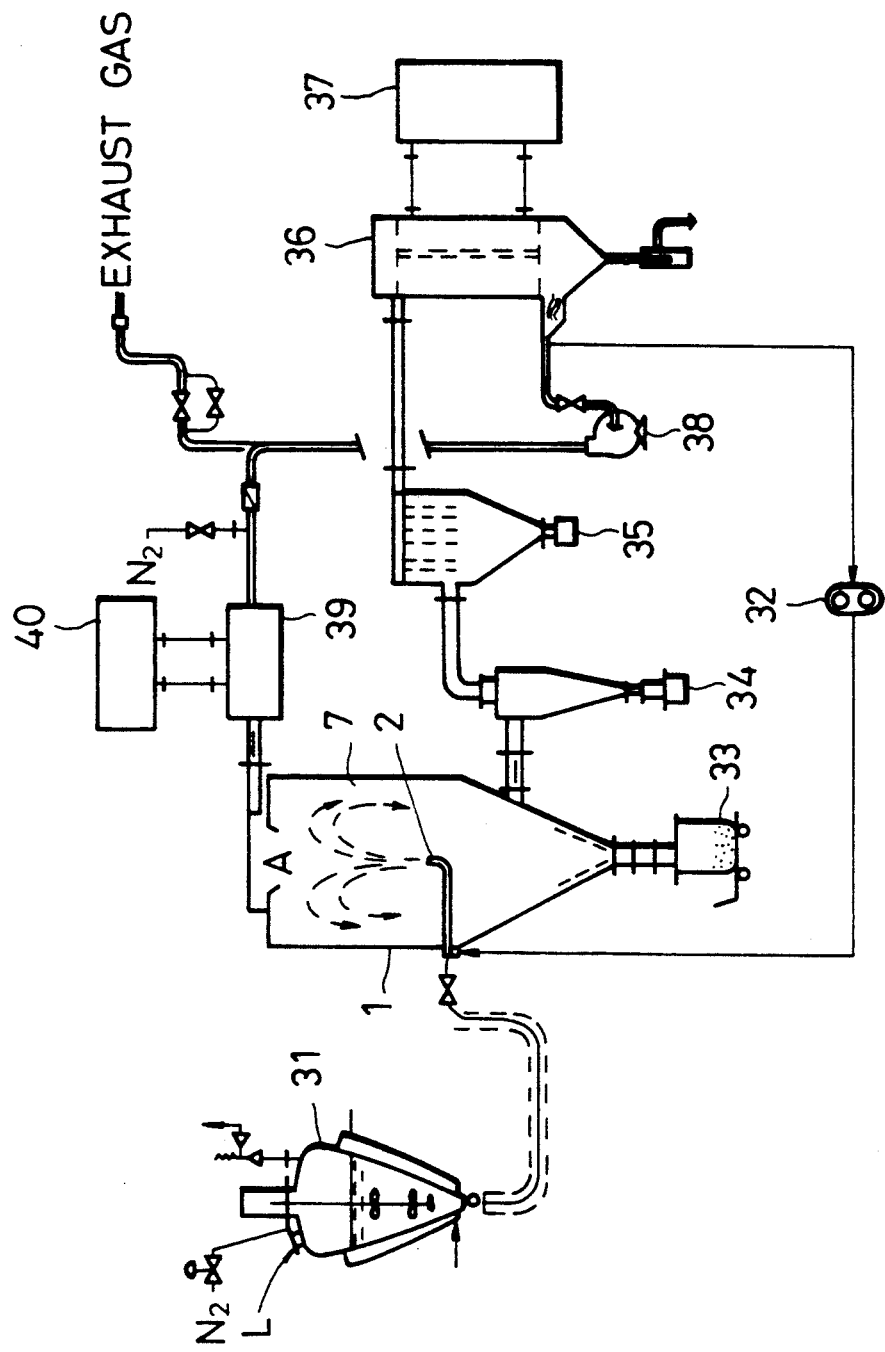

Next, the operation of the spray dryer is explained with reference to FIG. 3 showing an example of the spray dryer using the centrifugal pressure nozzle of the present invention and employing a closed system.

First, at the startup, water or a solvent fed from a pressure tank 31 via a feed liquid pipe 5 is sprayed by the centrifugal pressure nozzle 6 of the above-mentioned two-fluid pressure nozzle. This spraying is made at a considerably low pressure, but the resulting water or solvent droplets are made finer so as to have desired diameters because high-speed air is blown off upward from around the centrifugal pressure nozzle 6.

This secondary atomization into desired droplet diameters gives a space residence time of about two times that of downward blowing. Consequently, the water droplets can be completely dried by a hot gas A blown into a drying chamber 7 of a spray dryer 1. As a result, no liquid-phase water remains in the drying chamber 7; there is substantially no temperature distribution in the drying chamber 7; thereby, the temperature in the drying chamber 7 is made constant.

Next, a feed liquid L is sprayed upward from the centrifugal pressure nozzle 6 in the drying chamber of the spray dryer 1. When this operation is conducted by making small the volume of the air blown out from around the centrifugal pressure nozzle 6, the diameters of the droplets resulting from the feed liquid L are large, making it possible to obtain a desired powder product. In this case, since the two-fluid pressure nozzle 2 is directed upward, the particles of the powder product may deposit on the tip of the nozzle 2, but they can be purged by the air fed from the through-holes formed at the front end portion 9 of the jacket pipe 3.

In spraying the feed liquid L from the two-fluid pressure nozzle 2, blowout of a small amount of air from around the centrifugal pressure nozzle 6 via the air nozzle 4 gives an additional advantage because it cools the nozzle 2 and can prevent the clogging of the centrifugal pressure nozzle 6 with the feed liquid.

Then, the closed cycle of the spray dryer is explained.

The feed liquid L fed from the pressure tank 31 is sprayed upward by the two-fluid pressure nozzle 2 in the drying chamber 7 of the spray dryer 1 and falls drawing a parabola. The feed liquid droplets are dried by the hot gas A during the parabolic movement and collected as a particulate product 33 at the bottom of the spray dryer 1. Meanwhile, the hot gas A is cooled as a result of heat exchange with the particulate product 33, then sent to a cyclone 34 from an outlet provided at the side of the spray dryer 1 via a pipe, and subjected to gas-solid separation in the cyclone 34. The resulting gas is filtered by a bag filter 35 to remove very fine particles. The gas from the bag filter 35 is sent to an indirect type condenser 36 to remove the resulting liquid. The gas from the condenser 36 is sent to a heater 39 by a circulation blower 38, wherein the gas is heated to a desired temperature and reused.

Figure 4:
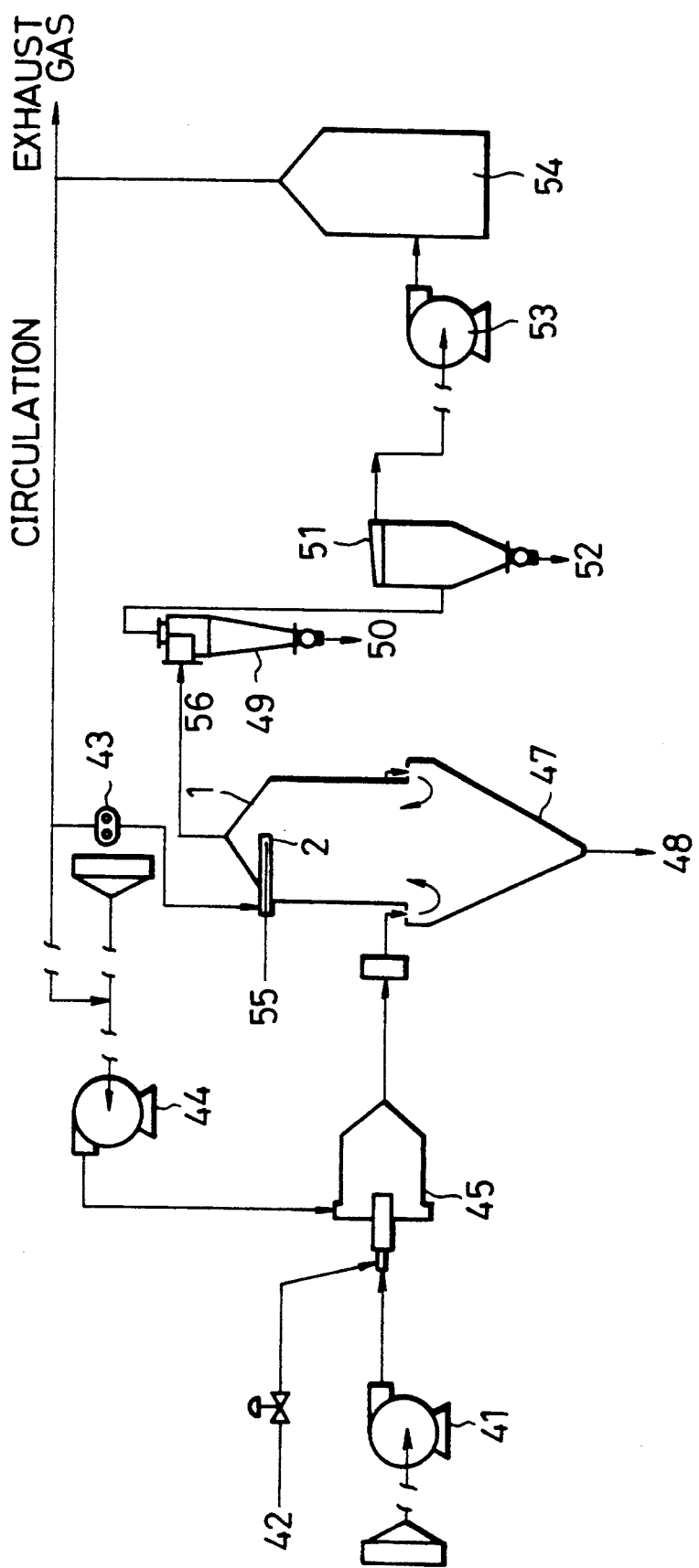

Subsequently, the semiclosed cycle of the spray dryer is explained with reference to FIG. 4. The air fed from a combustion blower 41 is used for combustion of a fuel 42 in a direct fired heater 45. The resulting hot gas consisting of a hot waste gas is sent to a drying chamber 47 of a spray dryer 1 and then introduced into a waste gas pipe 56 from the top of the spray dryer 1. In the spray dryer 1, the hot gas dries and solidifies the droplets formed by spraying of a feed liquid from a centrifugal pressure nozzle 2 provided at the top of the spray dryer 1 with the nozzle tip directed downward. The dried and solidified product 48 is collected at the bottom of the spray dryer 1. The hot gas which has completed the drying and solidification, is introduced into the exhaust gas pipe 56 as an exhaust gas. The exhaust gas is sent to a cyclone 49 to remove the solid present in the gas. The resulting gas is sent to a bag filter 51 to remove a fine powder present in the gas. The gas from the bag filter 51 is sent to a scrubber 54 by a circulation blower 53. In the scrubber 54, the gas is passed through a liquid to remove water (steam) or solvent evaporated by spray drying. The gas from the scrubber 54 is sent to a Roots blower 43 and a dilution fan 44. The exhaust gas sent to the Roots blower 43 is reused as a high-speed blowing gas for the centrifugal pressure nozzle 2. The exhaust gas sent to the dilution fan 44 is reheated by the direct fired heater 45 and reused as a hot gas for drying.

The gas used in the closed system and the semiclosed system is preferably an inert gas such as $N_2$, Ar, $CO_2$ or the like for prevention of fire, explosion and oxidation. Even in the semiclosed system where the combustion exhaust gas is partially circulated, it is possible to prepare an inert gas [($N_2$+$CO_2$)-rich gas], whereby fire, explosion or oxidation can be prevented. When it is aimed at to prevent only spreading of offensive odor, it is desired to use a closed system where air is used as a system gas and totally circulated.

Examples are described below.

EXAMPLE 1

A slurry obtained by dispersing a hard metal (WC+Co) powder in ethanol, was subjected to spray drying to effect granulation, using a closed system where $N_2$ gas was used as a hot gas for drying, for prevention of oxidation of the hard metal and prevention of fire or explosion by or of ethanol and where the exhaust gas was totally circulated. A two-fluid pressure nozzle as shown in FIG. 2 was used for spraying. The system circulation gas was used for atomization of the solvent (ethanol) at the startup and the shutdown, as well as for atomization of the slurry. However, the amount of the circulation gas used for atomization of the slurry was half the amount used for atomization of the solvent, in order to prevent deposition of product powder on the nozzle tip. As the nozzle, there was used SX type (orifice diameter: 1.06 mm, core type: 425) manufactured by Spraying Systems Co.

The following operating conditions were employed.
Feed liquid ... Hard metal-ethanol slurry
Solid content in feed liquid ... 80%
Viscosity of feed liquid ... 300 cp
Drying chamber
  Diameter ... 3 m
  Cylindrical portion height ... 3.5 m
  Conical portion height ... 2.6 m
Hot gas ... $N_2$ gas
$O_2$ concentration in hot gas ... 1 volume %
Temperature of hot gas ... 180° C.
Temperature of exhaust gas ... 70° C.
Spraying rate of feed liquid ... 150 kg/h
Spraying rate of solvent ... 30 kg/h
Feeding rate of hot gas ... 1,100 $Nm^3/h$
Atomization gas rate for feed liquid ... 10 $Nm^3/h$
Atomization gas rate for solvent ... 20 $Nm^3/h$
Spraying pressure for feed liquid ... 10 $kg/cm^2$
Spraying pressure for solvent ... 5 $kg/cm^2$
Average particle diameter of product ... 145 μm Under the above operating conditions, there arised no wetting of the wall surface of the drying chamber because sufficient atomization took place even in spraying of the solvent alone. Further, there was no clogging of the feed liquid pipe and the centrifugal pressure nozzle because the solvent was sprayed after the completion of feed liquid spraying. Furthermore, increase in $O_2$ concentration could be prevented because the system circulation gas ($N_2$) was used for secondary atomization at the nozzle.

Thus, in the present Example, the system circulation gas was used for secondary atomization at the nozzle. Therefore, as compared with when fresh $N_2$ gas was used for secondary atomization, 10 $Nm^3/h$ and 20 $Nm^3/h$ of fresh $N_2$ gas could be saved during the atomization of the slurry and during the atomization of the solvent alone, respectively.

EXAMPLE 2

An agricultural chemical was subjected to spray drying, in a semiclosed system where a $CO_2$- and $N_2$-rich gas obtained by direct combustion of kerosene was used as a hot gas for drying and where the exhaust gas was partially circulated. A two-fluid pressure nozzle as shown in FIG. 2 but having no air-purging throughholes was used for spraying. The system circulation gas was used for secondary atomization.

The nozzle was provided at the top of a drying chamber because the hot gas was fed upward from the bottom of the chamber, and liquid spraying was conducted downward. Therefore, arrangement was made so that the hot gas and the spraying formed a countercurrent, as in the case where a nozzle directed downward is provided at the top of a drying chamber and a hot gas is fed upward from the bottom of the drying chamber.

The following operating conditions were employed.
Feed liquid ... Agricultural chemical (activator + water + builder + surfactant)
Solid content in feed liquid ... 50%
Viscosity of feed liquid ... 3,000 cps
Drying chamber
  Diameter ... 2.2 m
  Cylindrical portion height ... 6 m
  Conical portion height ... 2 m
$O_2$ concentration in system ... 3% or less
Temperature of hot gas ... 200° C.
Temperature of exhaust gas ... 85° C.
Spraying rate of feed liquid ... 250 kg/h
Spraying rate of water ... 120 kg/h
Feeding rate of hot gas ... 2,400 $Nm^3/h$
Atomization gas rate for feed liquid ... 200 $Nm^3/h$
Atomization gas pressure for therefor ... 0.25 $kg/cm^2$
Atomization gas rate for water ... 200 $Nm^3/h$
Atomization gas pressure therefor ... 0.25 $kg/cm^2$
Spraying pressure for feed liquid ... 20 $kg/cm^2$
Spraying pressure for water ... 5 $kg/cm^2$
Orifice diameter of nozzle (SX Type manufactured by Spraying System) used ... 1.7 mm
Core type of the nozzle ... 425
Average particle diameter of product ... 70 μm Under the above operating conditions, there arised no wetting of the wall surface of the drying chamber because stable atomization took place even in spraying of water alone; stable operation was obtained soon after the startup; therefore, the product caused no thermal degradation.

If there is used air, in place of the system circulation gas, as an atomization gas at the nozzle, the average $O_2$ concentration in the system becomes 5.2% as follows.
$O_2$ amount from hot gas ... 2,400×0.04=96 $Nm^3/h$
$O_2$ amount from atomization air ... 200×0.2=40 $Nm^3/h$ (96+40)/(2,400+200)=5.2%

Thus, the use of air as an atomization gas gives an increased $O_2$ concentration in the system and is not desirable.

Next, the method for control of droplet diameter according to the present invention is described in more detail with reference to an example shown in FIG. 5 and FIG. 6.

Figure 5:
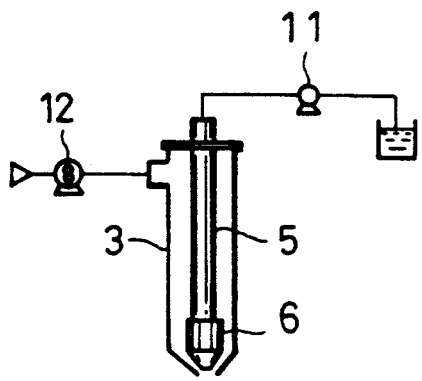

FIG. 5 is a cross-sectional view showing an example of the two-fluid pressure nozzle of the present invention. FIG. 6 is a fragmentary cross-sectional view of the front end portion of the two-fluid pressure nozzle of FIG. 5.

Figure 6:
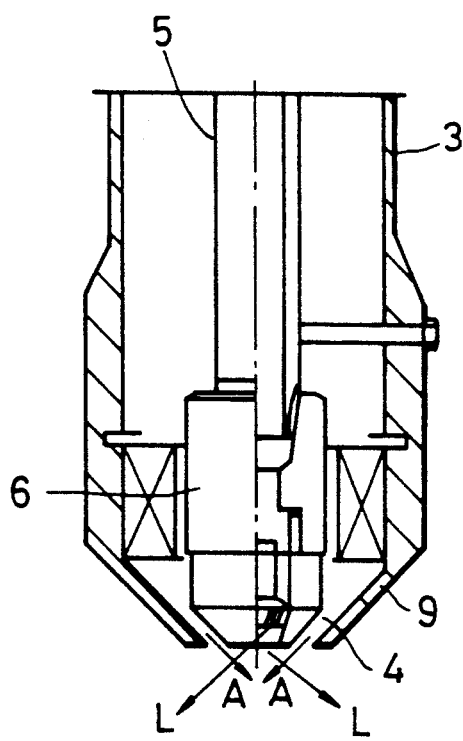
Figure 7:
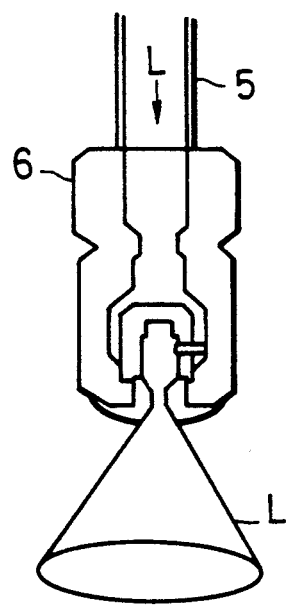

The two-fluid pressure nozzle of FIG. 5 and FIG. 6 comprises a feed liquid pipe 5 having a centrifugal pressure nozzle 6 at the front end and a jacket pipe 3 provided around the feed liquid pipe 5, having a tapered structure at the front end. In FIG. 5 and FIG. 6, the numeral 11 indicates a feed liquid pump; and the numeral 12 indicates a Roots blower; and the numeral 4 indicates an air nozzle.

The jacket pipe 3 of the two-fluid pressure nozzle has an opening of small cross-sectional area at the top end. Therefore, a high-speed gas for atomization is accelerated and expanded by the air nozzle 4 formed at the opening. This acceleration and expansion of atomization gas allows the thin film of hollow cone shape formed by primary atomization of a feed liquid, i.e., spraying of the feed liquid from the orifice provided at the center of the front end of the centrifugal pressure nozzle 6, to be subjected to secondary atomization (secondary spraying). As mentioned above, in the secondary spraying, there is a correlation between droplet diameter and gas flow speed.

Test Examples on the present method for control of droplet diameter are shown below.

TEST EXAMPLE 1

A correlation between gas flow speed and droplet diameter was confirmed experimentally with the feed liquid pressure kept constant.

In this test, as the centrifugal pressure nozzle, there was used SX Nozzle manufactured by Spraying System; as the liquid, there was used water of room temperature; as the atomization gas, there was used air of room temperature; the water pressure in the centrifugal pressure nozzle 6 was kept constant (3 kg/cm$^2$); by changing the air pressure in the jacket pipe 3 to change the flow speed of air blown out, air flow speed and average diameter of water droplet were measured. A laser diffraction particle analyzer (LDSA-1300A manufactured by Tonichi Computer) was used for the measurement of water droplet diameter.

The conditions used in the test are shown in Table 1.
The results of measurement for air flow speed and average diameter of water droplets are shown in Table 2.

TABLE 1

| | |
|---|---|
| Type of liquid | Water (room temperature) |
| Type of atomization gas | Air (room temperature) |
| Orifice diameter (mm)/core (mm) | 0.965/421 |
| Liquid pressure (kg/cm$^2$) | 3 |
| Liquid flow rate (kg/h) | 27 |

TABLE 2

| Air flow speed (m/sec) | Average water droplet diameter (μm) |
|---|---|
| 0 | 120 |
| 60 | 100 |
| 89 | 65 |
| 100 | 55 |
| 120 | 41 |
| 162 | 26 |

As is clear from Table 2, increase in air flow speed gives decrease in average water droplet diameter. Although not shown in Table 2, it was confirmed that average water droplet diameter could be controlled by controlling the flow speed of atomization air in a range of 20-200 m/sec, or by controlling the air pressure in the jacket pipe 3 in a range of 0.05-5 kg/cm$^2$. It is of course that the flow speed of atomization air or the air pressure in the jacket pipe 3 may be controlled in ranges other than mentioned above, depending upon the structure of the nozzle used.

TEST EXAMPLE 2

A natural polysaccharide solution was subjected to spray drying. The spray drying was effected in two cases, i.e., a case using a centrifugal pressure nozzle alone (accordingly no atomization air was used) and a case using a two-fluid pressure nozzle (accordingly secondary atomization was effected), and the results of the two cases are compared in Table 3.

TABLE 3

| Fed liquid | No air blowing | Two-fluid pressure nozzle |
|---|---|---|
| | Natural polysaccharide | |
| Orifice diameter | 2.04 | 2.04 |
| Spraying pressure (kgf/cm$^2$) | 80 | 80 |
| Treating rate (kg/h) | 325 | 325 |
| Liquid viscosity (cp) | 25 | 25 |
| Solid content in liquid (%) | 20 | 20 |
| Air pressure (kgf/cm$^2$) | | 0.3 |
| Air flow rate (kg/h) | | 250 |
| Air atomization speed (m/hr) | | 140 |
| Hot gas inlet temperature (°C.) | 180 | 180 |
| Exhaust gas outlet temperature (°C.) | 73 | 73 |
| Particle diameter (mm) | 80 | 30 |
| Angle of spraying (deg.) | 60 | 30 |
| State of drying | Insufficient drying and deposition | Good |

TEST EXAMPLE 3

A feed liquid was sprayed using a two-fluid pressure nozzle of large capacity having a centrifugal pressure nozzle of 4.0 mm in orifice diameter, whereby intended droplets of small diameter could be obtained. The air nozzle diameter was 23 mm. The results of measurement are shown in Table 4.

TABLE 4

| No. | Spraying pressure (kgf/cm$^2$) | Spraying rate (kg/h) | Air pressure (kgf/cm$^2$) | Air rate (kg/h) | Air speed (m/sec) | Diameter of water droplet (μm) |
|---|---|---|---|---|---|---|
| 1 | 60 | 1,400 | — | — | — | 120 |
| 2 | 60 | 1,400 | 0.22 | 267 | 150 | 80 |
| 3 | 40 | 1,150 | — | — | — | 130 |
| 4 | 40 | 1,150 | 0.22 | 267 | 150 | 65 |
| 5 | 15 | 660 | — | — | — | 180 |
| 6 | 15 | 660 | 0.22 | 267 | 150 | 50 |

As described above, in the two-fluid pressure nozzle of upward injection type according to the present invention, a feed liquid is sprayed upward from the bottom of a drying chamber. Therefore, the residence time of the feed liquid in the drying chamber is larger and the drying time is longer, enabling sufficient drying. Further, product deposition on the nozzle can be prevented by forming air-purging through-holes in the front end portion of the jacket pipe of the nozzle. When a hot gas for drying is fed from the bottom of the drying chamber, the nozzle can be effectively provided at the top of the drying chamber with the nozzle tip directed downward.

In the spray dryer employing a closed system according to the present invention, there can be prevented fire, explosion and odor spreading resulting from the type of the solvent used, as well as oxidation of the solute in the feed liquid. Further, the expensive or toxic solvent used in the feed liquid can be recovered effectively.

In the method for control of droplet diameter according to the present invention, as compared with the conventional method for control of droplet diameter by control of the pressure of a feed liquid in a centrifugal pressure nozzle, droplet diameter can be controlled without requiring a large number of nozzle parts, without requiring a particular know-how for selection of necessary nozzle parts, and without making temporary shutdown for replacement of nozzle parts. Accordingly, the present method can produce various powder products having a desired particle size at increased productivity.

What is claimed is:

1. A spray dryer comprising a drying chamber, a two-fluid pressure nozzle provided at the bottom of the drying chamber with the nozzle tip directed upward, an inlet for feeding a hot gas into the drying chamber, and an outlet for driving an exhaust gas out of the drying chamber, said two-fluid pressure nozzle comprising a centrifugal pressure nozzle for spraying a feed liquid and a cylindrical pipe for blowing out a high-speed gas, provided around the centrifugal pressure nozzle and said cylindrical pipe having a tapered structure at the front end portion with a plurality of air-purging through-holes provided in the tapered front end portion.

2. A spray dryer according to claim 1, wherein the hot gas to be blown into the drying chamber is fed by a closed system in which at least part of the exhaust gas after spray drying is recirculated to said inlet for feeding said hot gas into said drying chamber.

3. A spray dryer according to claim 1, wherein the high-speed gas for atomization is fed by a closed system in which at least part of the exhaust gas after spray drying is recirculated to said cylindrical pipe of said two-fluid pressure nozzle.

4. A spray dryer according to claim 1, wherein said centrifugal pressure nozzle comprises a tapered end proximate to said tapered front end portion of said cylindrical pipe.

5. A spray dryer according to claim 1, wherein both the high speed gas for atomization and the hot gas to be blown into the drying chamber are fed by closed systems in which portions of the exhaust gas after spray drying are recirculated respectively to said cylindrical pipe of said two fluid pressure nozzle and to said hot gas inlet of said drying chamber.

6. A spray dryer according to claim 1, wherein said inlet for feeding hot gas into the drying chamber is disposed at an upper portion of said drying chamber, and said outlet for driving exhaust gas out of the drying chamber is disposed at a lower portion of said drying chamber.

7. A spray dryer according to claim 1, wherein said plurality of air-purging through-holes provided in the tapered front end portion of said cylindrical pipe are disposed radially outwardly from a central outlet of said cylindrical pipe.

8. A spray dryer according to claim 7, wherein said centrifugal pressure nozzle comprises a tapered outlet end disposed proximate to said central outlet of said cylindrical pipe whereby the feed liquid sprayed from said centrifugal pressure nozzle passes via said outlet in said cylindrical pipe, and said plurality of air-purging through-holes are provided in said tapered front end portion of said cylindrical pipe upstream from the tapered outlet end of said centrifugal pressure nozzle.

9. A spray dryer comprising a drying chamber, a two-fluid pressure nozzle provided at the top of the drying chamber with the nozzle tip directed downward, an inlet for feeding a hot gas into the drying chamber, and an outlet for driving an exhaust gas out of the drying chamber, said two-fluid pressure nozzle comprising a centrifugal pressure nozzle for spraying a feed liquid and a cylindrical pipe for blowing out a high-speed gas, provided around the centrifugal pressure nozzle and said cylindrical pipe having a tapered structure at the front end portion, and means for recirculating said high-speed gas whereby at least part of said exhaust gas from said outlet is recirculated as high-speed gas to said cylindrical pipe of said two-fluid pressure nozzle.

10. A spray dryer according to claim 9, further comprising means for recirculating said hot gas whereby another part of said exhaust gas from said outlet is recirculated as hot gas to said inlet for feeding hot gas into said drying chamber.

11. A spray dryer according to claim 9, further comprising a plurality of air-purging through-holes provided in the tapered front end portion of said cylindrical pipe.

12. A spray dryer according to claim 9, wherein said centrifugal pressure nozzle comprises a tapered end portion proximate to said tapered front end portion of said cylindrical pipe of said two-fluid pressure nozzle.

13. A spray dryer according to claim 12, wherein said inlet for feeding hot gas is disposed at a lower portion of said spray dryer and said outlet for driving said exhaust gas out of the drying chamber is disposed at an upper portion of said drying chamber.

14. A spray dryer according to claim 11, wherein said plurality of air-purging through-holes provided in the tapered front end portion of said cylindrical pipe are disposed radially outwardly from a central outlet of said cylindrical pipe.

15. A spray dryer according to claim 14, wherein said centrifugal pressure nozzle comprises a tapered outlet end disposed proximate to said central outlet of said cylindrical pipe whereby the feed liquid sprayed from said centrifugal pressure nozzle passes via said outlet in said cylindrical pipe, and said plurality of air-purging through-holes are provided in said tapered front end portion of said cylindrical pipe upstream from the tapered outlet end of said centrifugal pressure nozzle.

* * * * *